(12) United States Patent
Whitworth et al.

(10) Patent No.: US 11,738,880 B2
(45) Date of Patent: Aug. 29, 2023

(54) AIR-TO-AIR COUPLING

(71) Applicant: Mission Systems Wimborne Limited, Wimborne (GB)

(72) Inventors: Samuel John Whitworth, Wimborne (GB); Henry Thomas Clarke, Wimborne (GB); Edward Haydn Coward, Wimborne (GB)

(73) Assignee: Cobham Missions Systems Wimborne Limited, Wimborn (GB)

( * ) Notice: Subject to any disclaimer, the term of this patent is extended or adjusted under 35 U.S.C. 154(b) by 47 days.

(21) Appl. No.: 17/121,649

(22) Filed: Dec. 14, 2020

(65) Prior Publication Data

US 2021/0188458 A1 Jun. 24, 2021

(30) Foreign Application Priority Data

Dec. 24, 2019 (GB) .................................... 1919304

(51) Int. Cl.
*B64D 39/06* (2006.01)
*F16L 37/00* (2006.01)
(Continued)

(52) U.S. Cl.
CPC ............ *B64D 39/06* (2013.01); *F16L 37/002* (2013.01); *F16L 37/18* (2013.01); *F16L 37/40* (2013.01)

(58) Field of Classification Search
CPC ........ B64D 39/06; F16L 37/002; F16L 37/18; F16L 37/40
See application file for complete search history.

(56) References Cited

U.S. PATENT DOCUMENTS

| 2,199,588 A | * | 5/1940 | Alan | ..................... B64D 39/06 251/149.6 |
| 2,803,473 A | | 8/1957 | Hohmann | |

(Continued)

FOREIGN PATENT DOCUMENTS

| EP | 2607237 | 6/2013 |
| EP | 2952434 | 12/2015 |

(Continued)

OTHER PUBLICATIONS

Richard Tanner, 'History of Air to Air Refueling, MK XVI Air Refueling Package, 2006.

(Continued)

*Primary Examiner* — Justin M Benedik
(74) *Attorney, Agent, or Firm* — Dorsey & Whitney LLP (57) ABSTRACT

An air-to-air coupling 13 (e.g. for receiving a probe in probe-and-drogue refuelling) comprises retaining members 19, 27 for interacting with a further member (e.g. a refuelling probe) to hold the further member in place. An active drive system 39, 21 may drive the holding members and may thereby also actively drive the further member into place. Alternatively the active drive 39, 21 may drive another member such as a locking member 31 to hold the retaining members 19, 27 in position once the further member is in place. The active drive releases the retaining members 19, 27 or moves them out of position to allow the further member to be removed. This allows the further member to be inserted and removed with a lower force than is used to hold it in place. The coupling may also be used for in-air recovery of an unmanned aircraft.

18 Claims, 5 Drawing Sheets

(51) Int. Cl.
*F16L 37/18* (2006.01)
*F16L 37/40* (2006.01)

(56) References Cited

U.S. PATENT DOCUMENTS

| | | |
|---|---|---|
| 3,475,001 A | 10/1969 | Hieber |
| 6,604,711 B1 | 8/2003 | Stevens et al. |
| 9,933,521 B2 | 4/2018 | Riley et al. |
| 2009/0184205 A1 | 7/2009 | Matheny |
| 2010/0108815 A1 | 5/2010 | Stecko et al. |
| 2011/0052039 A1 | 3/2011 | Urabe et al. |
| 2012/0168564 A1* | 7/2012 | Feldmann .............. B64D 39/04 244/135 A |
| 2013/0028377 A1 | 1/2013 | Kovarik et al. |
| 2015/0293225 A1 | 10/2015 | Riley et al. |
| 2015/0344147 A1 | 12/2015 | Espinoza et al. |
| 2017/0190440 A1 | 7/2017 | McLaughlin |
| 2017/0341735 A1 | 11/2017 | Bernhardt et al. |
| 2018/0016026 A1 | 1/2018 | Carlson et al. |
| 2018/0057021 A1 | 3/2018 | Sevey |
| 2019/0057528 A1 | 2/2019 | Black et al. |
| 2019/0272660 A1 | 9/2019 | Black et al. |
| 2021/0061493 A1 | 3/2021 | Pattison et al. |
| 2021/0300584 A1 | 9/2021 | Campbell et al. |
| 2021/0300585 A1 | 9/2021 | Dibb et al. |

FOREIGN PATENT DOCUMENTS

| | | |
|---|---|---|
| EP | 3715815 | 9/2020 |
| FR | 2736614 | 1/1997 |
| GB | 724159 | 2/1955 |
| GB | 2405384 | 3/2005 |
| GB | 2418186 | 3/2006 |
| GB | 2454593 | 5/2009 |

OTHER PUBLICATIONS

Military Specification, Nozzle, Ariel Pressure Refueling, Type MA-2, Feb. 12, 1981.
Detail Specification Sheet, Nozzle-Type MA-2, Flight Pressure Refueling, Apr. 18, 2016.
European Search Report dated Jan. 29, 2021 for EP20192330.7.
Chen Chao, et al., Drogue Tracking Using 3D Flash Lidar for Autonomous Ariel Refueling, Laser radar Technology and Applications, vol. 8037, Jan. 11, 2011.

* cited by examiner

AIR-TO-AIR COUPLING

FIELD OF THE INVENTION

The present invention relates to an air-to-air coupling which may be used, for example, in probe-and-drogue air-to-air refuelling.

BACKGROUND

In probe-and-drogue air-to-air refuelling a tanker aircraft will typically trail behind it a hose-and-drogue assembly comprising a refuelling hose at the end of which is a reception coupling for receiving a probe on the receiver aircraft to be refueled. A drogue is mounted on the reception coupling to help to guide the probe into the reception coupling and to provide a balance between weight and air resistance so that the probe and drogue trail at an appropriate angle and at an appropriate distance below the tanker aircraft to enable the probe on the receiver aircraft to be inserted through the drogue and into the reception coupling. As the probe enters the reception coupling, it will normally engage with the reception coupling to open a valve near the front of the probe (typically a slide valve) in order to allow fuel to flow into a refuelling channel in the probe and to open a valve in the reception coupling (typically a poppet valve) to allow fuel to flow out through the end of the hose, thereby enabling flow of fuel from the tanker aircraft to the receiver aircraft. As the probe approaches the correct position in the reception coupling, it normally has to force apart spring-loaded latches in the reception coupling, which then snap into one or more latch-receiving recesses in the probe to hold it in the correct position relative to the reception coupling during the refuelling operation. Typically, the slide valve on the probe and the poppet valve on the reception coupling are spring-loaded with the spring holding the valves in the closed position. Accordingly, as the probe approaches the correct position in the reception coupling, it has to be inserted with sufficient force to overcome the spring loadings of both valves and to overcome the spring loading of the latches.

SUMMARY OF THE INVENTION

An aspect of the present invention provides an air-to-air coupling for holding a suitably shaped further member presented to it, the coupling comprising one or more retaining members that are movable between a release position in which the further member can move past the retaining members and a holding position in which the retaining members interact with a corresponding portion of the further member to hold the further member in a desired position relative to the coupling, the coupling having a drive system (a) responsive to a latching signal indicating that the said further member is in or has approached the desired position to urge the one or more retaining members towards the holding position and/or to hold the one or more retaining members in the holding position and (b) responsive to a release signal to permit or urge the one or more retaining members to move from the holding position towards the release position.

The latching signal may be generated in response to detection by a sensor that the said further member is in or has approached the desired position. Preferably such a sensor is mounted on the coupling. It can be positioned to detect the presence of the further member once the further member has reached the position at which it is desired to urge the retaining member or members towards the holding position.

Embodiments of the invention may enable the retaining members to hold the further member in the desired position, once the latching signal has been provided, against a stronger removal force than the force required to move the further member towards the desired position before the latching signal is provided or the force required to remove the further member from the desired position after the release signal is provided.

The invention may be applied to a probe and drogue air-to-air refuelling system. In this case, the coupling is preferably a reception coupling fitted to the refuelling hose for receiving the tip of the refuelling probe. In this case, the suitably shaped further member is the tip of the refuelling probe. Alternatively, the coupling may be fitted to the probe and the reception coupling may be the suitably shaped further member, but this is less preferred. The refuelling probe tip preferably has the shape and size required by US Department of Defense Detail Specification Sheet MS24356 Version E dated 18 Apr. 2016, in compliance with US Department of Defense Specification MIL-N-25161 Version C at paragraph 3.6.3.

When the invention is applied to a probe-and-drogue refuelling system, the provision of the Latching signal is preferably not dependent on the supply of pressurised fuel to the reception coupling. In operation of a probe-and-drogue refuelling system, the latching signal is preferably provided before pressurised fuel is delivered to the reception coupling.

Embodiments of the invention may allow a probe to be inserted into a drogue and reception coupling for air-to-air refuelling with less force than is usually required with known spring-loaded latches, while still maintaining the force for holding the probe into the reception coupling while refuelling is taking place. This reduction in the required insertion force may allow air-to air refuelling to be carried out with receiver aircraft that are not normally suitable for air-to-air refuelling, such as for example an unmanned aerial vehicle.

In some embodiments a probe is not required to apply any force to the one or more retaining members in order to reach the desired position and/or a probe is not required to apply any force to the one or more retaining members in order to leave the desired position after the drive system has responded to the release signal. In other embodiments, the force that the probe has to apply to the one or more retaining members can be set to a preferred value.

An embodiment of the invention may also be used in a system for in-air recovery of an unmanned aerial vehicle by a mother aircraft, with or without refuelling of the unmanned aerial vehicle.

In an embodiment the action of the drive system in response to the latching signal has the effect of moving the one or more retaining members to an intermediate position in which they can interact with a said further member that has approached the desired position, and then moving the one or more retaining members towards the holding position while the one or more retaining members are interacting with the said further member so as to drive the said further member into the desired position. If this feature is applied to a probe-and-drogue air-to-air refuelling system, it is preferred that the retaining members are arranged to drive the said further member with sufficient force to overcome any forces that tend to hold closed any valve that is opened by the movement of the probe and the reception coupling into the correct mutual position for refuelling. This enables a latching system to be provided in which the aircraft being refueled is only required to manoeuvre its probe into the drogue and reception coupling sufficiently to trigger the latching signal, and the latching system drives the probe into the final refuelling system, opening the valves, without any further force being required from the aircraft being refueled. If the further member is a refuelling probe tip (nozzle) in accordance with US Department of Defense Detail Specification Sheet MS24356 Version E, the coupling is preferably a reception coupling with a poppet valve arranged to be opened by the end of the probe tip when it is in the desired position and the coupling is arranged so that when the one or more retaining members are in the intermediate position they can engage with the probe tip at a position in which the probe tip is not in contact with the poppet valve, and then movement of the one or more retaining members towards the holding position while they are engaged with the probe tip moves the probe tip into the desired position, bringing the probe tip into contact with the poppet valve and opening the poppet valve.

Preferably the coupling is arranged to release a said further member, typically by allowing the one or more retaining members to move to their release position, if the further member exerts a force on the one or more retaining members in a release direction which force exceeds a predetermined limit. This provides a safety release if the further member is unexpectedly withdrawn from the coupling with a force that might lead to damage of one or more parts if the force is resisted.

In some embodiments, the one or more retaining members are non-resiliently held in the holding position, at least until the force on retaining members in a release direction reaches a predetermined limit (which may be the same as the predetermined limit described above or may be different, e.g. a lower limit). This has the effect that, in normal use, the position of a further member held in the coupling by the retaining members does not vary when the force applied to the retaining members by the further member varies. By contrast, when a refuelling probe is held in a reception coupling by some known types of spring-loaded passive latches, the resilience of the spring-loading means that the probe position changes slightly as the force on the probe varies. It is particularly useful if the retaining members are able to resist non-resiliently forces that are sideways with respect to the release direction, so that a further member can be held correctly in position sideways in the coupling even when the further member exerts a varying sideways force.

If the tip of a refuelling probe breaks off during air-to-air refuelling, separation of the fuel-receiving aircraft from the hose-and-drogue assembly does not remove the probe tip from the reception coupling. In this case, application of the release signal in an embodiment of the present invention allows the force required to remove the probe tip to be removed or reduced sufficiently to allow the broken-off probe tip to be ejected from the hose-and drogue assembly by the spring force of the poppet valve (or other valve) in the reception coupling and/or the spring force of the slide valve (or other valve) in the probe tip.

In an embodiment the drive system responds to the release signal to cause a force to be applied to the one or more retaining members to urge them towards the release position.

In an embodiment the action of the drive system in response to the release signal has the effect of moving the one or more retaining members out of the holding position while the one or more retaining members are interacting with the said further member so as to drive the said further member out of the desired position. In the case of a probe-and-drogue air-to-air refuelling system, this can be used to provide a way to eject a broken-off probe tip from the hose-and-drogue assembly.

The drive system may drive the one or more retaining members directly or indirectly. Alternatively, the drive system may drive some other part (such as a locking device) so as to have the effect of holding the one or more retaining members in the holding position without necessarily driving the one or more retaining members towards the holding position.

In an aspect of the present invention an air-to-air coupling, e.g. for receiving a probe in probe-and-drogue refuelling, comprises retaining members for interacting with a further member (e.g. a refuelling probe) to hold the further member in place. An active drive system may drive the holding members and may thereby also actively drive the further member into place. Alternatively the active drive may drive another member such as a locking member to hold the retaining members in position once the further member is in place. The active drive releases the retaining members or moves them out of position to allow the further member to be removed. This allows the further member to be inserted and removed with a lower force than is used to hold it in place. The coupling may also be used for other purposes such as in-air recovery of an unmanned aircraft.

In embodiments that are used for refuelling, it is preferable that the drive system is able to urge the one or more retaining members towards the holding position, or to hold the one or more retaining members in the holding position, in the absence of any supply of pressurised fuel to the air-to-air coupling, and preferably the drive system operates to urge or hold the one or more retaining members before pressurised fuel is supplied to the air-to-air coupling.

In an embodiment of the invention that can be used for purposes other than refuelling, the coupling may be connected to a drogue and also connected to a cable but without any refuelling hose being present. In this case, the coupling does not need to include any valve for controlling fuel flow. Such an arrangement can be trailed behind an aircraft and may be used to connect to another aircraft for a purpose other than refuelling, such as for example the mid-air recovery of an unmanned aircraft (UAV).

Further aspects of the invention and optional features are set out in the accompanying claims.

The latching signal and the release signal may be separate signals. Alternatively, latching signal and the release signal may be different states of a common signal. For example, the common signal may an electronic control signal in which a signal "high" state represents one of the latching signal and the release signal and a signal "low" state represents the other of latching signal and the release signal. In another example the drive system may comprise an electric motor or an electric actuator such as a solenoid and the common signal may be an electric drive current for the motor or actuator. In this case the presence of the electric drive current may represent the latching signal, causing the electric motor or electric actuator to operate, and the absence of the electric drive current may represent the release signal, causing the electric motor or electric actuator to cease operation, or a drive current in the reverse direction may represent the release signal, causing the electric motor or electric actuator to reverse its operation. The drive system may comprise an electric motor or an electric actuator that is operated against a return spring and the common signal may be an electric drive current for driving the motor or actuator against the return spring. In this case the latching signal may be either one of the presence or the absence of the electric drive current and the release signal may be the other of the presence or the absence of the electric drive current.

The drive system does not need to comprise an electric motor or actuator. For example, it may comprise one or more hydraulic actuators. The latching and release signals may be the provision of pressurised fluid to different hydraulic lines or may be differences in fluid pressure in one or more hydraulic lines.

BRIEF DESCRIPTION OF THE DRAWINGS

Embodiments of the present invention, given by way of non-limiting example, will now be described with reference to the accompanying drawings.

DETAILED DESCRIPTION OF EMBODIMENTS

Figure 1:
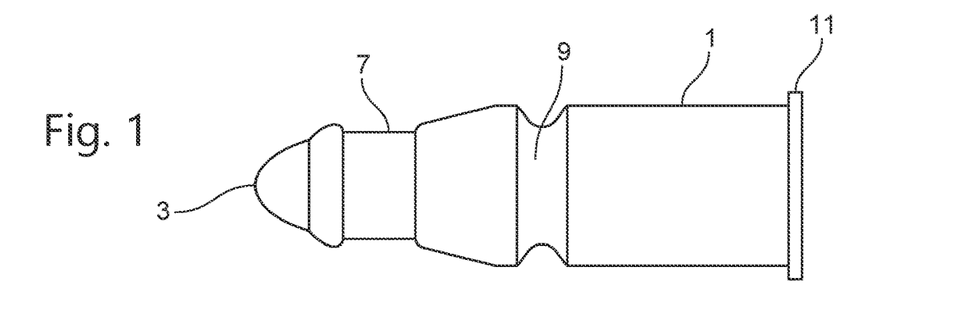
FIG. 1 shows a valve body forming a probe tip for an air-to-air refuelling probe.
Figure 2:
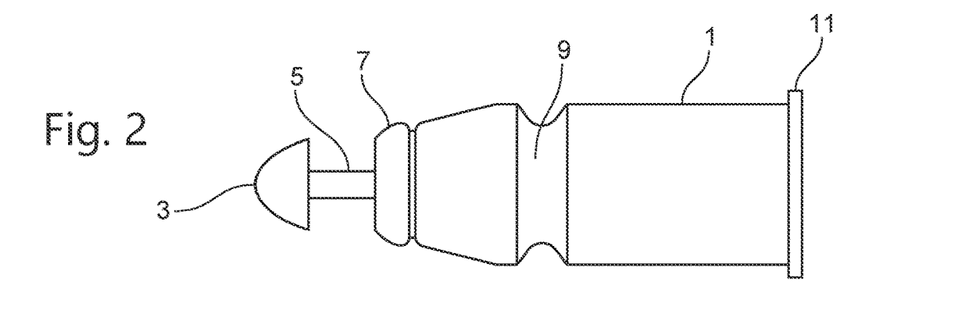
FIG. 2 shows the valve body of FIG. 1 with a slide valve in its open state.

FIGS. 1 and 2 show a valve body that forms the probe tip of a refuelling probe to enable an aircraft to receive fuel in probe-and-drogue air-to-air refuelling. The valve body comprises a hollow main casing 1 and a nose 3 mounted on the main casing 1 by a support shaft 5. In FIG. 1 the space between the main casing 1 and the nose 3 is closed by a hollow cylindrical valve slide 7. The valve slide 7 can slide axially into the main casing 1, as shown in FIG. 2, against a spring-loading (not shown) that biases it into the closed position shown in FIG. 1. This provides a slide valve for the fuel line inside the refuelling probe.

During air-to-air refuelling, the tip of the refuelling probe on the receiver aircraft is inserted into the drogue at the end of the hose trailing from the tanker aircraft, and the drogue guides the probe tip into a reception coupling fitted to the end of the hose. As the probe tip (comprising the valve body of FIGS. 1 and 2) is inserted into the coupling, the valve slide 7 interacts with a portion of the coupling so that further insertion of the probe tip into the coupling pushes the valve slide 7 back into the main casing 1 as shown in FIG. 2, thereby opening the slide valve and allowing the fuel line in the probe to receive fuel. During this further insertion of the probe tip into the coupling, the nose 3 is pushed further into the coupling by its support shaft 5, so that it pushes back a spring-loaded valve poppet of a poppet valve in the coupling so as to open the valve. The poppet valve normally closes the end of the fuel line in the hose, and opening of this valve allows the hose to deliver fuel to the probe. A recess 9 in the main casing 1 of the valve body receives retaining members of the coupling to hold the probe tip in the correct position in the coupling.

A flange 11 is provided at the rear end of the main casing 1. This enables the valve body to be mounted on the main part of the probe. This mounting is designed to be weaker than the remainder of the probe so that if there is a sudden excessive force between the coupling and the probe, the valve body breaks off from the remainder of the probe thereby minimising damage to the receiver aircraft.

Preferably the shape and dimensions of the nose 3, the valve slide 7 and at least the part of the main casing 1 from its end at the valve slide 7 up to and including the recess 9 comply with US Department of Defense Detail Specification Sheet MS24356 Version E.

Figure 3:
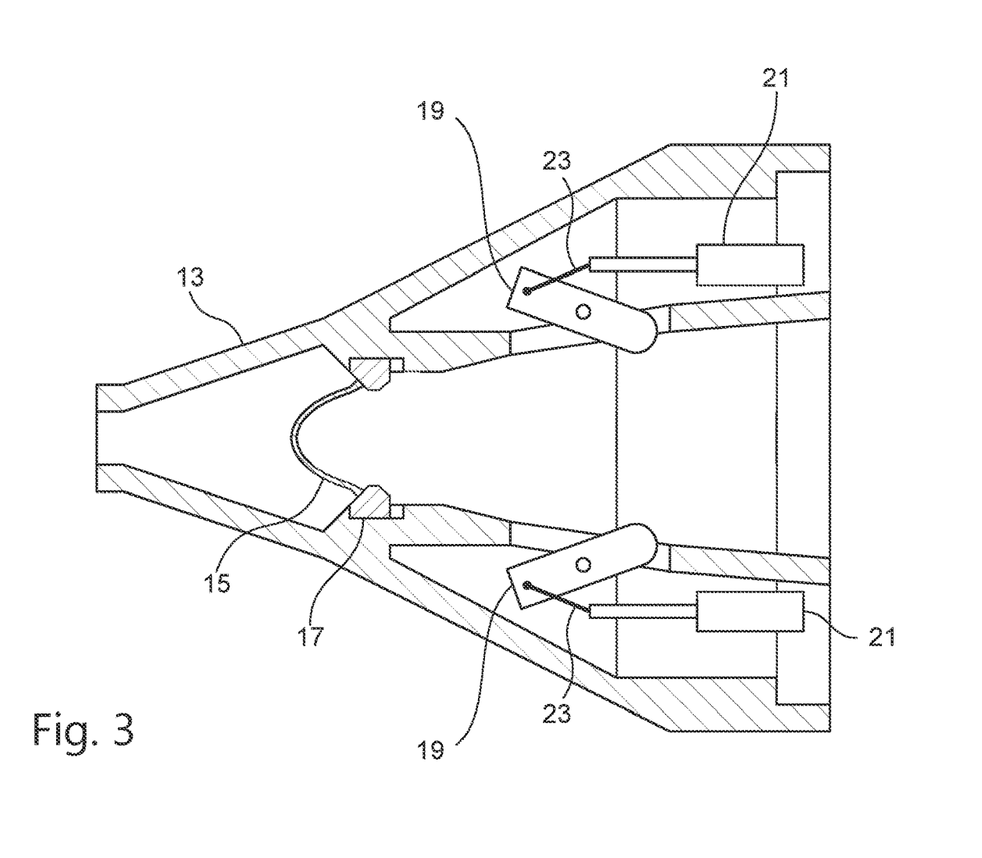
FIG. 3 shows a reception coupling, for an air-to-air refuelling hose-and-drogue assembly, embodying the coupling of the present invention.

FIG. 3 shows a generally conical reception coupling 13 for a hose-and-drogue assembly. In use its narrow end is fitted to the end of the refuelling hose, usually via a ball joint. The drogue is fitted to its wide end. The hose is closed by a poppet valve having a valve poppet 15 that is spring-loaded (not shown) into its closed position in which it is pressed against a valve seat 17 as shown in FIG. 3.

In an air-to-air refuelling operation, the tip of a refuelling probe is received into the wide end of the coupling 13 to push back the valve poppet 15 and open the poppet valve. Rotatable retaining members 19 are hinged to the main body of the coupling 13 to interact with the recess 9 of the probe tip. Unlike prior art spring-loaded latches, which are passive and have to be forced apart by the probe during insertion, the retaining members 19 are actively driven by a drive system comprising actuators 21 that are connected to the retaining members 19 by links 23. The operation of the retaining members during a refuelling operation will be described with reference to FIGS. 4 to 7.

Figure 4:
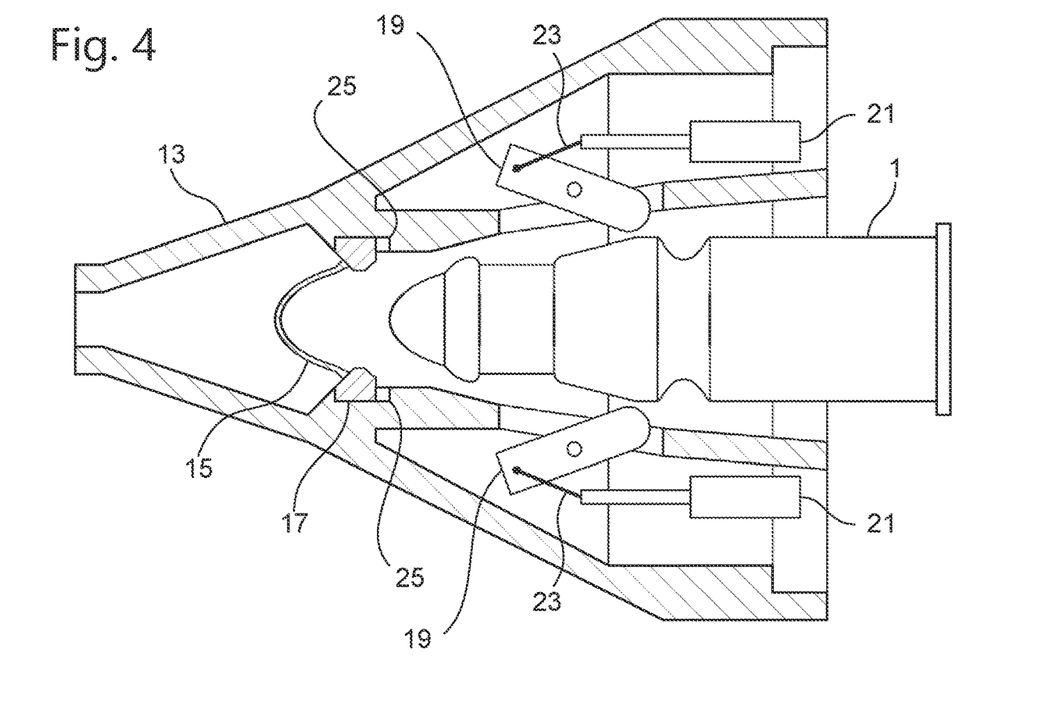
FIG. 4 shows the reception coupling of FIG. 3 with the valve body of FIG. 1 partially inserted into it.
Figure 5:
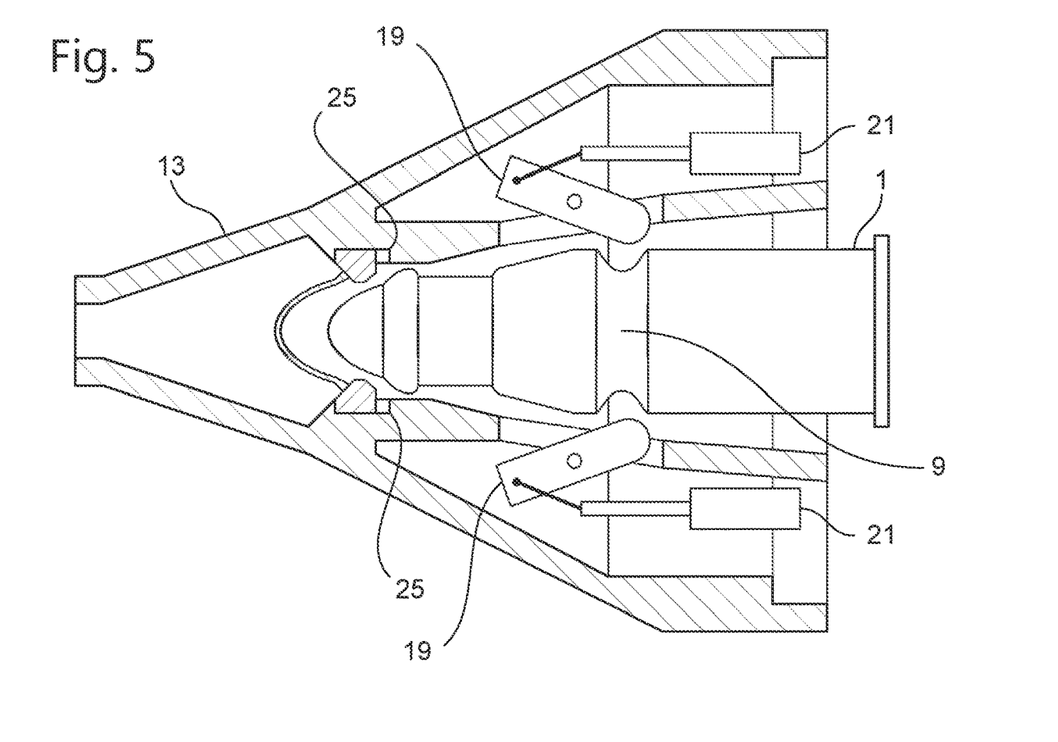
FIG. 5 shows the reception coupling of FIG. 3 with the valve body of FIG. 1 in position for operation of the retaining members of the reception coupling.

At the beginning of a refuelling operation the actuators 21 are fully extended, as shown in FIGS. 3, 4 and 5. In this position, the retaining members 19 face the wide end of the coupling 13 and are further apart than the width of the probe tip (valve body of FIGS. 1 and 2). The probe tip is guided into the wide end of the coupling 13 by the drogue. As shown in FIG. 4, the probe tip can pass between the retaining members 19 without needing to push the retaining members 19 apart. Therefore the probe tip does not need to apply any force to the retaining members 19 in order to pass between them.

In FIG. 5 the probe tip has passed further into the coupling 13, and the recess 9 on the main casing 1 of the valve body is aligned with the ends of the retaining members 19 of the coupling 13. The presence of the probe tip in this position is detected by sensors 25. The sensors 25 may be of any convenient type. For example, they could provide a light beam system which detects the presence of the probe tip by interruption of a light beam, or they could respond electrically or magnetically to a triggering device mounted in the probe tip e.g. using the Hall Effect. Preferably the coupling 13 is designed so that, provided the probe tip has a shape and dimensions that comply with US Department of Defense Detail Specification Sheet MS24356 Version E, the nose 3 of the probe tip has not reached the valve poppet 15 when the probe tip in this position. Also, preferably the coupling 13 is designed so that, provided the probe tip has a shape and dimensions that comply with US Department of Defense Detail Specification Sheet MS24356 Version E, the valve slide 7 has not yet been pushed back into the main casing 1 by interaction with the coupling 13 when the probe tip in this position.

Figure 6:
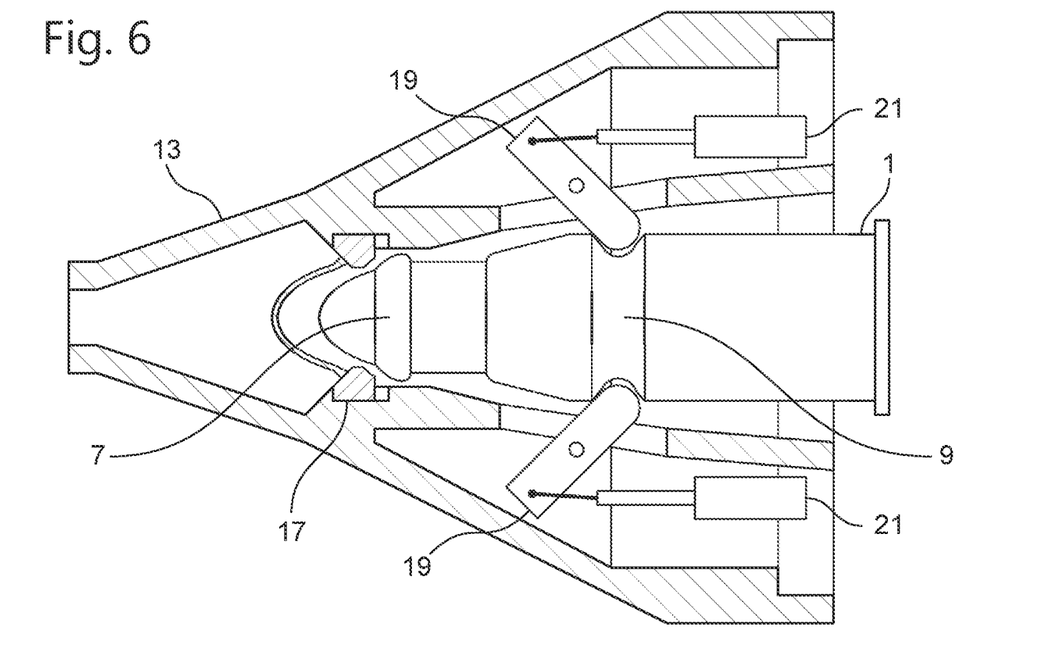
FIG. 6 shows the reception coupling of FIG. 3 with retaining members gripping the valve body of FIG. 1 before further movement.

A latching signal is sent to the drive system for the retaining members 19 in response to detection of the probe tip by the sensors 25. As a result, the actuators 21 retract, rotating the retaining members 19. In FIG. 6, the actuators 21 have retracted sufficiently that the retaining members 19 have entered the recess 9 of the main casing 1 of the valve body of the probe. As the actuators 21 continue to retract, the retaining members 19 are further rotated and interact with the recess 9 to drive the probe tip further into the coupling 13. As this happens, the valve slide 7 of the valve body (probe tip) is driven against the valve seat 17 of the coupling 13. Preferably the coupling 13 is designed so that, provided the probe tip has a shape and dimensions that comply with US Department of Defense Detail Specification Sheet MS24356 Version E, the nose 3 of the probe tip has not reached the valve poppet 15 when the probe tip is the position at which the retaining members 19 enter the recess 9. Also, preferably the coupling 13 is designed so that, provided the probe tip has a shape and dimensions that comply with US Department of Defense Detail Specification Sheet MS24356 Version E, the valve slide 7 has not yet been pushed back into the main casing 1 by interaction with the coupling 13 when the probe tip in the position at which the retaining members 19 enter the recess 9.

Figure 7:
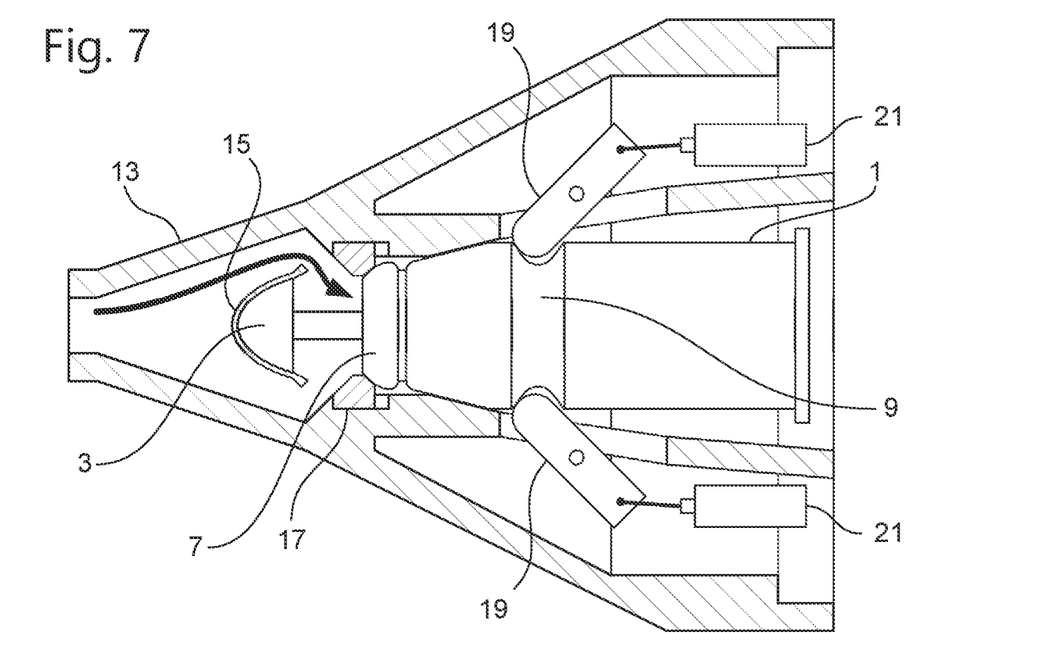
FIG. 7 shows the reception coupling of FIG. 3 after the retaining members have moved the valve body of FIG. 1 into position for refuelling.

Continued retraction of the actuators 21 and rotation of the retaining members 19 continues to drive the probe tip into the coupling 13, but interaction with the valve seat 17 prevents the valve slide 7 from moving with the rest of the probe tip. Therefore the valve slide 7 slides back into the main casing 1 of the valve body, opening the valve of the fuel line in the probe. Continued movement of the probe tip forces the nose 3 of the valve body against the valve poppet 15 of the coupling 13, pushing the valve poppet 15 back and opening the poppet valve. FIG. 7 shows the state where the actuators 21 have retracted fully, and the retaining members 19 have rotated to face the narrow end of the coupling 13, pushing the probe tip into its desired correct position for refuelling. In this state, the slide valve of the probe tip is held open by interaction between the valve slide 7 and the valve seat 17, and the poppet valve of the coupling 13 is held open by interaction between the nose 3 of the probe tip and the valve poppet 15. A path is now open for fuel to flow from the fuel line in the refuelling hose of the tanker aircraft into the fuel line in the probe of the receiver aircraft, as shown by the thick arrow in FIG. 7.

The movement of the probe tip from the position shown in FIG. 6 to the position shown in FIG. 7 is driven by rotation of the retaining members 19, which are in turn driven by the actuators 21 via the links 23. The force required to overcome the spring loading of the valve poppet 15 and the valve slide 7 preferably comes entirely from the actuators 21, so that no force is required from the probe tip to move from the position shown in FIG. 6 to the position shown in FIG. 7.

Preferably the latching signal is provided, the actuators 21 have been retracted, and the probe tip (valve body) is securely held in the correct position in the coupling 13 by the retaining members 19, as shown in FIG. 7, before pressurised fuel is provided along the fuel line of the hose to the coupling 13.

Preferably the force applied by the actuators 21 to the retaining members 19 is non-resilient, i.e. the actuator position does not vary in response to any force applied to the actuators 21 by the retaining members 19 via the links 23 at least up to a threshold force in the links 23. Consequently the retaining members 19 can hold the main casing 1 of the valve body in position without significant movement even if the main casing 1 exerts forces that are sideways, axial or twisting with respect to the coupling 13.

When the refuelling of the receiver aircraft is complete a release signal is provided to the drive system for the retaining members 19. In response to this, the actuators 21 extend, rotating the retaining members 19 in the reverse direction. As a result, the retaining members 19 interact with the recess 9 of the main casing 1 of the valve body to move the probe tip back to the position shown in FIG. 6, and further rotation of the retaining members 19 releases the probe tip. The valve poppet 15 moves under its spring loading to close the poppet valve and the valve slide 7 moves under its spring loading to close the slide valve. In this way the probe is separated from the coupling 13 without the need for the receiver aircraft to provide any separation force.

This embodiment allows the probe tip to move into engagement with the coupling 13 at the beginning of the refuelling operation, and to move out of engagement with the coupling 13 at the end of the refuelling operation, with the exertion of little or no force from the receiver aircraft, but the probe is nevertheless held in engagement during the refuelling operation with sufficient force to avoid unwanted disengagement in mid-refuelling.

As a safety precaution the actuators 21 can be designed to allow the retaining members 19 to move back to the release position if the retaining members 19 exert a force on the actuators that exceeds a threshold or limit. This enables the retaining members to release the valve body (probe tip) in order to avoid damage if it exerts an excessive withdrawal force even though the release signal has not been provided. For example, if the actuators 21 are electromagnetic, they can be designed to apply a predetermined force when they are fully retracted as in FIG. 7. In this case, they will prevent the retaining members 19 from moving so long as the force in the links 23 is less than this predetermined force. However, if the retaining members 19 are pushed towards their release position so strongly that the force in the links 23 exceeds the predetermined force of the actuators 21, the actuators 21 will extend allowing the retaining members 19 to move and the main casing 1 of the valve body to withdraw from the coupling 13.

Other arrangements are possible. For example, if the actuators are hydraulic they may be driven by hydraulic fluid held at a predetermined pressure. This predetermined pressure will translate into a predetermined maximum force in the links 23. If the force applied by the retaining members 19 exceeds this predetermined maximum, the hydraulic fluid pressure in the actuators will be overcome and the actuators will extend, allowing the retaining members 19 to move.

As another alternative, the retaining members 19 may be connected to the actuators 21 by springs which allow the retaining members to move into their release position without requiring the actuators 21 to extend, if the spring force is overcome. However, this option is less preferred because the springs will introduce resilience in the force applied to the retaining members 19, making it likely that they will move slightly under the influence of a force from the main casing 1 of the valve body even when that force is less than the force required to overcome the springs entirely. As a result, this design may tend to hold the valve body (probe tip) in position less securely than the previously-described arraignments.

If the probe tip breaks off and is retained in the coupling 13, the operation of the retaining members 19 following the release signal provides a force to expel the broken-off probe tip from the coupling 13 without the need to the tanker aircraft to land. This may be useful in situations where the tanker aircraft would otherwise be unable to refuel any further receiver aircraft until it had returned to its base to allow ground staff to remove a broken-off probe tip from its hose-and-drogue assembly.

The actuators 21 may be electrical and may for example be double-acting solenoids. Alternatively a different drive arrangement may be used for the actuators 21. For example, they may comprise double-acting hydraulic cylinders. It is also possible to provide the required operation of the actuators 21 if they are single acting against a return spring, so that the retaining members 19 are driven in one direction by the actuator operation and are driven in the other direction by the return spring.

In an alternative design, the actuators 21 provide a positive drive to the retaining members 19 to move them from the position shown in FIG. 5 to the position shown in FIG. 7 following the latching signal, but following the release signal the actuators 21 are deactivated and do not provide a positive force to drive the retaining members 19 back to the position shown in FIG. 5. Provided that the retaining members 19 can be moved in this state by the application of a very low external force, the return springs of the valve poppet 15 and the valve slide 7 may be sufficient to push the probe tip out of engagement with the coupling 13 following the release signal. Therefore the probe can still be separated from the coupling 13 without the need for the receiver aircraft to provide any separation force and a broken-off probe tip can still be ejected from the coupling 13 without the need to the tanker aircraft to land. However, if hinged retaining members 19 are used as shown in FIGS. 3 to 7 it is preferred that there should be at least a small return force applied to the retaining members 19 by the drive system so that the retaining members return reliably to the position shown in FIGS. 4 and 5 and do not obstruct the insertion of a subsequent probe tip.

Other designs of actuator 21 may be used. For example, the piston type actuators shown in FIGS. 3 to 7 may be replaced by rotary actuators that act to rotate the retaining members 19.

Figure 8:
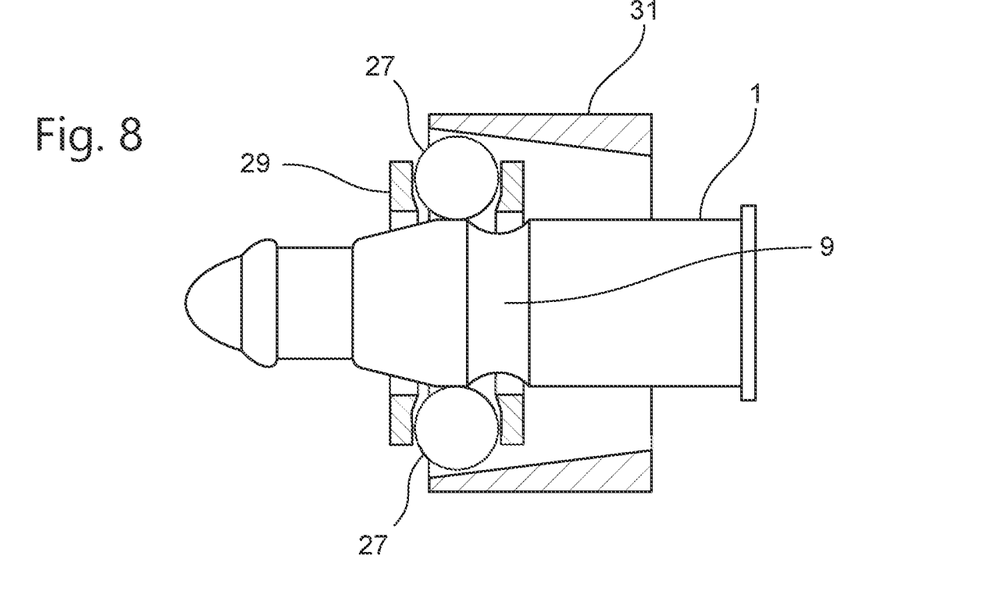
FIG. 8 shows the retaining members in a second embodiment of the invention, with the valve body of FIG. 1 partially inserted.
Figure 9:
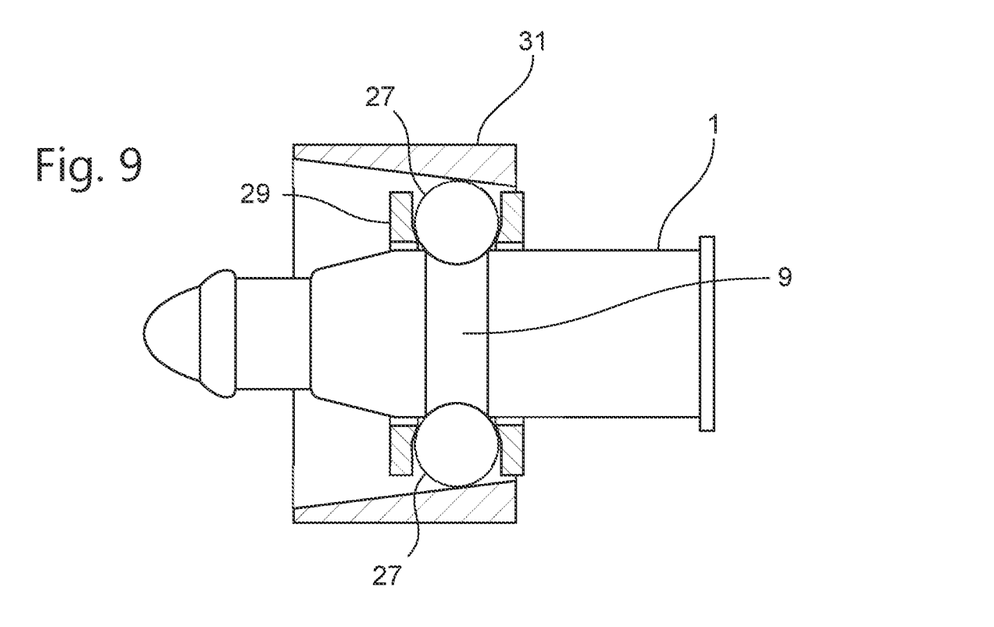
FIG. 9 shows the retaining members of FIG. 8 held in positon after the valve body has been fully inserted.

FIGS. 8 and 9 show the latching arrangement in another embodiment. In this embodiment the retaining members are balls 27 that are positioned in a ring around the space in the coupling 13 that is occupied by a probe tip during refuelling. The balls 27 are loosely held in a ball cage 29. The balls 27 and the cage 29 are surrounded by a movable locking ring 31 having a tapered inner surface. FIG. 8 shows the latching arrangement in its released or unlatched state. The locking ring 31 is in its unlocking position, with its inner surface sufficiently spaced from the cage 29 to allow the balls 27 to move in a direction that is radial of the space in the coupling 13 (and is also radial of the locking ring 31).

As the probe tip is inserted into the coupling, it requires negligible force to push the balls 27 apart (into their release positions) so that the probe tip can pass between them. Once the probe tip reaches the desired position, i.e. the correct position for refuelling in which both the slide valve of the probe tip and the poppet valve of the coupling are open, the latching signal is provided. In response to this signal, the drive system moves the locking ring 31 into its locking position as shown in FIG. 9. In this position the locking ring 31 has moved axially with respect to its position in FIG. 8. Owing to the taper in the inner surface of the locking ring 31, it now holds the balls 27 in the recess 9 of the probe tip, moving the balls 27 into this position if necessary. The balls 27 are now in their holding positions, the latching arrangement is in its latched state, and the probe tip is held securely in position. In response to the release signal, the drive system moves the locking ring 31 back to the position shown in FIG. 8.

The balls 27 cannot move out of their holding positions for as long as the locking ring 31 is in its locking position. Therefore this embodiment holds the probe tip securely in its correct position and varying forces applied by the probe tip, whether sideways, twisting, or axial, do not cause any movement of the probe tip in the coupling 13 until the locking ring 31 is moved.

The locking ring 31 may be driven between the unlocking position shown in FIG. 8 and the locking position shown in FIG. 9 by an axial translation. Alternatively, it can be mounted with a screw thread and rotated to move it between the unlocking and locking positions.

Unlike the embodiment of FIGS. 3 to 7, the drive system in this embodiment does not drive the retaining members (i.e. the balls 27) directly. Instead the drive system drives the locking ring 31. In a modification of this embodiment the balls 27 may be weakly biased, e.g. by springs, into their holding position by just enough force to hold them in this position against gravity. In this case, once the recess 9 of the probe tip (valve body) is aligned with the balls 27, the balls 27 will move into the recess so that the balls 27 are already in position and do not need to be moved when the locking ring 31 is driven from its unlocking position to its locking position. Therefore the operation of the drive system does not necessarily cause movement of the retaining members, but serves to hold the retaining members in the holding position or release them from the holding position.

Unlike the embodiment of FIGS. 3 to 7, the retaining members (the balls 27) do not interact with the probe tip to move the probe tip into the desired position. Instead, the retaining members interact with the probe tip once it is in its desired position. Consequently the sensors 25 should be arranged so that they detect when the probe tip is in the desired position. In this case, rather than detecting the position of the probe tip directly the sensors could be arranged to detect the position of the valve poppet 15.

In the embodiment of FIGS. 8 and 9 the receiver aircraft needs to provide the force necessary to move the valve poppet 15 and the valve slide 7. However, little or no force is needed to move the retaining members (i.e. the balls 27). In a known system using passive spring-loaded latches to hold the probe tip in place during refuelling, the force required to move the latches so as to enable the probe tip to pass and reach the desired position is a substantial part of the force required from the receiver aircraft during the process of docking the probe in the hose-and-drogue assembly. Therefore this embodiment allows the force required from the receiver aircraft to be reduced. However, when the probe is in the desired position, unwanted disengagement in mid-refuelling is opposed by a very strong force if the probe attempts to move out of the desired position while the locking ring 31 is in its locking position.

In this embodiment, the force that the probe (and therefore the receiver aircraft) is required to exert in order to displace the retaining members (balls 27) and allow the probe tip to move past them may be negligible, or it may be set a preferred value by biasing the balls 27 (or other retaining members) as required.

If the locking ring 31 moves between its locking position and its unlocking position by an axial translation, and the angle of the taper of its inner surface is made steeper (closer to 45° C.), it is possible for outward forces from the balls 27 to tend to drive the locking ring 31 from its locking position to it unlocking position. This allows the embodiment of FIGS. 8 and 9 to release the valve body (probe tip) to avoid damage if the main casing 1 of the valve body is pulled very strongly out of the coupling 13. In such an arrangement, the locking ring 31 is biased into its locking position (e.g. by a spring) with a predetermined force. As the valve body is pulled out of the coupling 13, it applies a force to the balls 27 pushing them outwards. This in turn applies a force to the locking ring 31 pushing it towards its unlocking position against the bias force. For as long as the force applied by the balls 27 to the locking ring 31 does not exceed the bias force holding the locking ring 31 in its locked position, the locking ring 31 does not move and therefore the balls 27 cannot move and the valve body is held securely in position. If the force applied by the balls 27 to the locking ring overcomes the bias force, the locking ring moves towards its unlocked position and the balls 27 can move outwards, releasing the valve body and allowing the probe to decouple from the coupling 13.

In the embodiment of FIGS. 8 and 9 the balls 27 do not move the probe tip following the release signal. Therefore the balls 27 cannot be used to remove a broken-off probe tip from the coupling 13. However, once the locking ring 31 has moved to its unlocking positon following the release signal the force required to move the balls 27 is very low and therefore a broken-off probe tip can be ejected by the spring force of the valve poppet 15 and the valve slide 7.

The embodiment of FIGS. 8 and 9 is an example of a latching arrangement in which the retaining members engage with the probe tip to hold it in place once the probe tip is in the desired position, but which do not move the probe tip into position. Other embodiments are possible. For example, retaining pins could be provided, positioned at the same place in the coupling as the balls 27, which are driven into engagement with the recess 9 or retracted from it by the action of solenoids.

In another embodiment, known spring-loaded latches are modified by providing a drive system comprising actuators to oppose the spring loading. At the beginning of the refuelling procedure the actuators are activated to overcome the spring force and retract the latches, or alternatively to counteract the spring force sufficiently that the probe tip requires a substantially reduced force to push the latches aside and pass between them. Following the latching signal, the actuators are deactivated, allowing the latches to be driven into engagement with the probe tip under the full spring force. Following the release signal the actuators are activated again to overcome or counteract the spring loading and enable the probe tip to be removed easily.

In further embodiments, the reception coupling of the previous embodiments may be used in a line-and-drogue assembly in which the hose of a hose-and-drogue assembly is replaced by a line that does not carry fuel. In this case, the poppet valve is not required and may be omitted. This assembly may be used with a suitable probe on another aircraft as part of a probe-and-drogue system for mid-air connection between aircraft, e.g. to enable the aircraft carrying the line-and-drogue assembly to recover the aircraft having the probe. Such a system may be used to catch and recover an unmanned aerial vehicle (UAV) without requiring the UAV to land.

Many forms are possible for the latching signal and the release signal, depending on the nature of the drive system. They may be separate electronic data signals, or may be different states of the same data signal (e.g. a high voltage representing a data "1" may be the latching signal and a low voltage representing a data "0" may be the release signal). The latching and release signals may be electric drive currents or hydraulic drive pressures that are applied to actuators that make up all or part of the drive system. The latching and release signals may be different states of a common electric drive current. For example, one of the latching and release signals may comprise the presence of an electric drive signal that activates one or more actuators and the other of the latching and release signals may comprise the absence of an electric drive current so that the one or more actuators is deactivated. Alternatively the other of the latching and release signals may comprise an electric drive current in the reverse direction of current flow, so as to activate the one or more actuators for operation in the opposite direction.

The latching and release signals may be generated by a control system in response to inputs such as one or more signals from the sensors 25 and one or more control signals e.g. to indicate when the system should be active and when the release signal should be generated.

Figure 10:
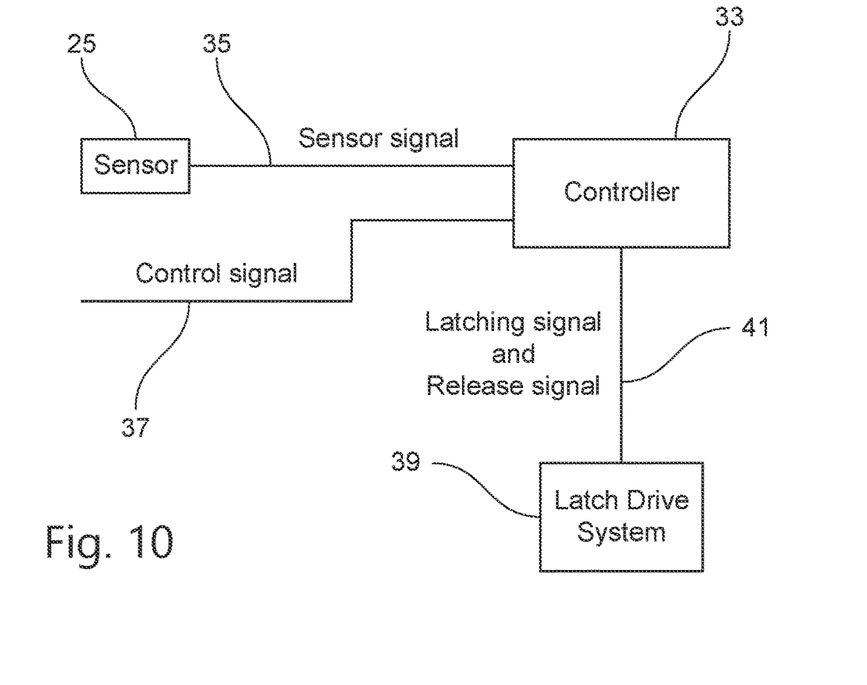
FIG. 10 shows schematically a control system for controlling the drive system of the coupling.

A simple control system is illustrated in FIG. 10. A controller 33 receives a sensor signal 35 from the sensors 25 and a control signal 37 from the tanker aircraft for indicating whether the probe latching system should be active. The controller 33 generates the latching and release signals in response to the sensor signal 35 and the control signal 37 and sends the latching and release signals to the latch drive system 39.

The logic required in the controller 33 may be very simple. For example, the sensor signal 35 may have a logic "1" to indicate the presence of the probe Up and a logic "0" to indicate absence of the probe tip, the control signal 37 may have a logic "1" to indicate that the latching arrangement should be active and a logic "0" to indicate that the latching arrangement should be inactive (and the release signal should be generated), and the latching signal may be a logic "1" for a latching/release data signal 41 sent from the controller 33 to the drive system 39 and the release signal may be a logic "0" for the latching/release signal 41.

In operation, the control signal 37 would be set to "1" at the beginning of a refuelling operation to indicate that the latching arrangement should be active. At this time the probe tip has not entered the coupling 13 and so the sensor signal 35 is at logic "0". In this state the retaining members 19, 27 should not be driven into or held in the holding position, and so the latching/release signal 41 should be at logic "0" indicating "release". When the sensors 25 detect the probe tip, the sensor signal 35 changes to logic "1". In response to this, the controller 33 changes the latching/release signal 41 to logic "1" indicating "latching" and the drive system 39 responds by driving the retaining members 19, 27 into the holding position (as in the embodiment of FIGS. 3 to 7) or by holding the retaining members 19, 27 in the holding position (as in the embodiment of FIGS. 8 and 9). When refuelling is complete the control signal 37 is manually or automatically changed to logic "0" to override the sensor signal 35 and cause the controller 33 to generate the release signal. Accordingly the controller 33 responds by changing the latching/release signal 41 to logic "0" indicating "release". The drive system responds by ceasing to hold the retaining members 19, 27 in the holding position (and by moving the retaining members 19 into the release position in the case of the embodiment of FIGS. 3 to 7). As the probe tip is withdrawn from the coupling 13, the sensors 25 cease to detect its presence and so the sensor signal changes to logic "0". The controller 33 does not respond to this change, and the latching/release signal remains at logic "0" indicating "release". The system may remain in this state until the start of the next refuelling operation.

Figure 11:
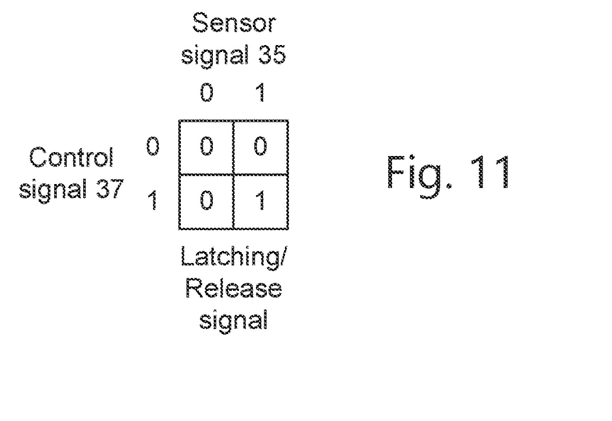
FIG. 11 shows a truth table for a simple implementation of the controller of FIG. 10.
Figure 12:
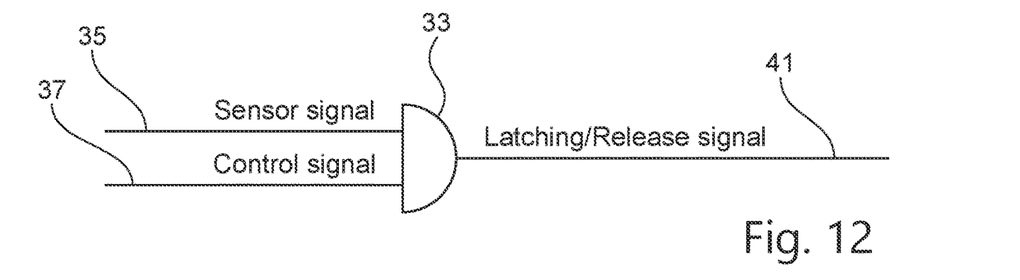
FIG. 12 shows a logic gate for implementing the truth table of FIG. 11.

The logic of this operation is set out in the truth table shown in FIG. 11. It can be seen that this corresponds to a logical AND operation. Accordingly the required logic in the controller 33 can in principle be implemented simply by a logical AND gate as shown in FIG. 12.

The embodiments described above and illustrated in the drawings are provided by way of non-limiting example. As will be apparent to those skilled in the art, further embodiments are possible.

The invention claimed is:

1. An air-to-air coupling usable as part of a probe-and-drogue system for releasably connecting in mid-air a first aircraft, on which the coupling is mounted, to a second aircraft, the coupling comprising:
one or more retaining members movable between
a holding position in which they can interact with a suitably shaped further member, mounted on the second aircraft, to hold the further member in a predetermined position relative to the coupling, and
a release position in which the retaining members permit the further member to move past them;
one or more sensors for detecting the presence of said further member and providing a sensor signal in response thereto;
a controller responsive to the sensor signal to output a latching signal when said one or more sensors provide said sensor signal in response to detection that said further member is at a first position in which it has approached but has not reached the predetermined position; and
a drive system being
(a) responsive to said latching signal to urge the one or more retaining members along a path of movement from the release position towards the holding position, the path of movement including an intermediate position, at which the one or more retaining members can interact with said further member that is in said first position and further movement of the one or more retaining members along said path of movement from the intermediate position towards the holding position will tend to drive said further member from the first position towards the predetermined position and/or to hold the one or more retaining members in the holding position and
(b) responsive to a release signal to permit the one or more retaining members to move from the holding position towards the release position or to urge the one or more retaining members from the holding position towards the release position.

2. An air-to-air coupling according to claim 1 comprising one or more sensors for detecting the presence of said further member and providing a sensor signal in response thereto, and a controller responsive to the sensor signal to output the latching signal to the drive system.

3. An air-to-air coupling according to claim 1 in which the one or more retaining members are mounted for rotation between the holding position and the release position and the drive system is coupled to the one or more retaining members to drive them in rotation.

4. An air-to-air coupling according to claim 1 in which the drive system is operable, in response to the latching signal, to drive the one or more retaining members from the release position via the intermediate position towards the holding position.

5. An air-to-air coupling according to claim 1 in which the drive system is operable in response to the release signal to drive the one or more retaining members away from the holding position towards the release position thereby tending to drive said further member, with which the one or more retaining members have interacted, away from the predetermined position.

6. An air-to-air coupling according to claim 1 in which the one or more retaining members are resiliently biased towards the holding position and the drive system is operable, before the latching signal is received, to oppose the resilient bias of the one or more retaining members to reduce or eliminate the force required to move the one or more retaining members from the holding position to the release position, the drive system being arranged to respond to the latching signal by removing or reducing its opposition to the resilient bias and to respond to the release signal by restoring its opposition to the resilient bias.

7. An air-to-air coupling according to claim 1 in which the one or more retaining members are movable from the release position into the holding position if said further member is in the predetermined position, and the drive system is responsive to the latching signal to move a locking member into a position to obstruct movement of the one or more retaining members from the holding position to the release position.

8. An air-to-air drogue coupling assembly comprising a coupling according to claim 1 and a drogue connected thereto.

9. An air-to-air drogue coupling assembly comprising a coupling according to claim 1 and a drogue connected thereto.

10. An air-to-air connector comprising an air-to-air drogue coupling according to claim 8 and a cable connected thereto in the absence of a refuelling hose.

11. An air-to-air refuelling hose-and-drogue assembly comprising an air-to-air drogue coupling assembly according to claim 8 and a refuelling hose connected thereto.

12. An air-to-air refuelling hose-and-drogue assembly comprising an air-to-air drogue coupling assembly according to claim 9 and a refuelling hose connected thereto.

13. An air-to-air refuelling hose-and-drogue assembly comprising an air-to-air coupling according to claim 4, the assembly having a fuel line and a valve member that is resiliently biased into a closed position in which it closes the fuel line, the valve member being movable against its resilient bias into an open position in which it does not close the fuel line, and the drive system is operable, in response to the latching signal, to drive the one or more retaining members towards the holding position with sufficient force to overcome the resilient bias of the valve member in the case that the one or more retaining members have interacted with said further member and that movement of the further member into the predetermined position moves the valve member into the open position.

14. An air-to-air refuelling hose-and-drogue assembly according to claim 13 in which,
provided the further member has a circumferential recess into which the one or more retaining members can extend when the one or more retaining members are in the intermediate position and the further member has a shape and dimensions that comply with US Department of Defense Detail Specification Sheet MS24356 Version E, the further member does not displace the valve member from its closed position when the one or more retaining members are in the intermediate position and extend into the circumferential recess, and the further member holds the valve member in its open position when the one or more retaining members are in the holding position and extend into the circumferential recess.

15. An air-to-air refuelling hose-and-drogue assembly comprising an air-to-air coupling according to claim 1, the assembly having a fuel line and a valve member that is resiliently biased into a closed position in which it closes the fuel line, the valve member being movable against its resilient bias into an open position in which it does not close the fuel line, the resilient bias of the valve member being sufficient to move said further member out of the predetermined position, against any opposition from the one or more retaining members following the release signal, in the case that the further member holds the valve member in the open position when the further member is in the predetermined position.

16. An air-to-air refuelling hose-and-drogue assembly according to claim 11 in which the drive system is arranged to respond to a latching signal to urge the one or more retaining members towards the holding position and/or to hold the one or more retaining members in the holding position in the absence of any pressurised fuel in the air-to-air coupling.

17. A method of operating an air-to-air refuelling hose-and-drogue assembly according to claim 11 in which the latching signal is provided and the drive system is operated to urge the one or more retaining members towards the holding position and/or to hold the one or more retaining members in the holding position before pressurised fuel is supplied to the air-to-air coupling.

18. A method of operating an air-to-air refuelling hose-and-drogue assembly according to claim 12 in which the latching signal is provided and the drive system is operated to urge the one or more retaining members towards the holding position and/or to hold the one or more retaining members in the holding position before pressurised fuel is supplied to the air-to-air coupling.

* * * * *